United States Patent Office 3,408,358
Patented Oct. 29, 1968

3,408,358
PYRIDYL-THIENYL KETONES AND PROCESSES
FOR PREPARING SAME
Goetz E. Hardtmann, Florham Park, and Hans Ott, Convent Station, N.J., assignors to Sandoz Inc., Hanover, N.J.
No Drawing. Filed Mar. 6, 1967, Ser. No. 620,613
9 Claims. (Cl. 260—294.8)

ABSTRACT OF THE DISCLOSURE

The compounds are of the class pyridyl-thienyl ketones which are useful as anti-inflammatory agents and are prepared either by (1) reacting a cyanopyridine with a lithium derivative of thiophene, (2) reacting thiophene with a pyridinecarbonyl halide or (3) oxidizing the corresponding carbinol with chromium trioxide.

This invention relates to monoketones having unsubstituted heterocyclic rings attached to both sides of the carbonyl group. In particular, the invention pertains to monoketones having an unsubstituted thienyl radical attached to one side of the carbonyl group and an unsubstituted 2- or 3 -pyridyl radical attached to the other side of the carbonyl group. The invention also is concerned with processes for preparing the above compounds.

The ketones of the present invention may be represented structurally as follows:

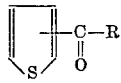
I wherein R represents 2-pyridyl or 3-pyridyl.

The above compounds are prepared by reacting a 2- or 3-cyanopyridine with a lithium derivative of thiophene as illustrated by the following reaction scheme:

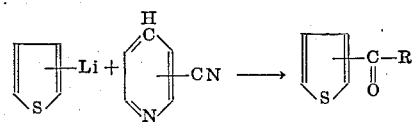
I wherein R is as defined above.

The reaction is conveniently carried out in an inert organic solvent, e.g., diethyl ether, tetrahydrofuran and toluene, and at room temperature (20–25° C.) or below. Preferably, the reaction is carried out at a temperature of from about —70° C. to about —10° C. The desired product is readily isolated employing conventional techniques.

Compounds of Formula I wherein the carbonyl is attached to the 2-position of the thiophene nucleus and R is as above defined, can also be prepared by reacting thiophene with a picolinoyl or nicotinoyl halide in the presence of a Friedel-Crafts catalyst, e.g., zinc chloride, stannic chloride and aluminum chloride, as illustrated by the following reaction scheme:

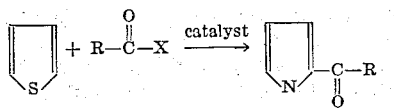
Ia wherein R is as previously defined and X represents halo having an atomic weight of from 35 to 80, i.e., chloro or bromo. The reaction is carried out in an inert organic solvent, e.g., carbon disulfide, chlorobenzene and m-dichlorobenzene, and at a temperature of from about —20° C. to about 40° C. Preferably, the reaction temperature is in the range of from about —10° C. to about 10° C. The desired product obtained in this manner is readily isolated in conventional manner.

In a further process for preparing the compounds of Formula I, a carbinol of the formula

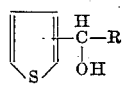
II wherein R is as previously defined, is oxidized to the corresponding ketone by treating the former in an inert organic solvent with chromium trioxide. The solvent employed should, of course, be compatible with the oxidizing agent. Suitable solvents include pyridine, mixtures of acetone with sulfuric acid, and mixtures of water and lower aliphatic acids, e.g., aqueous acetic acid and aqueous propionic acid. The reaction is conveniently effected at a temperature of from about —10° C. to about 40° C. Preferably, the reaction temperature is in the range of from about 10° C. to about 25° C.

The above procedures for preparing the ketones of Formula I can also be utilized to prepare those ketones of Formula I wherein R is additionally 4-pyridyl. Such compounds possess pharmacological activity in animals and can be used for the same purposes and administered in the same manner indicated hereinafter for the compounds of Formula I.

The carbinols (II) employed as starting materials in the last mentioned process are prepared by reacting a pyridine carboxaldehyde with a lithium derivative of thiophene. The reaction is conveniently carried out in an inert organic solvent, e.g., diethyl ether, tetrahydrofuran and toluene. The temperature at which the reaction is effected is dependent upon the particular thiophene reactant employed. When the 2-lithium thiophene is employed the reaction is carried out at a temperature of from about —40° C. to about 40° C. and preferably from about —40° C. to about —10° C. When the 3-lithium thiophene is employed the reaction temperature is desirably in the range of from about —70° C. to about 25° C. and preferably from about —70° C. to about —30° C. The above procedure can also be utilized to prepare those carbinols of Formula II where R is also 4-pyridyl. Such carbinols can be converted to corresponding ketones by treatment with chromium trioxide in the manner indicated hereinabove.

The compounds of Formula I are useful because they possess pharmacological activity in animals. In particular, such compounds are useful as anti-inflammatory agents. For such usage the compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspensions or emulsions. The dosage administered will, of course, vary depending upon the compound employed and mode of administration. However, in general, satisfactory results are obtained when administered at a daily dosage of from about 1 milligram to about 20 milligrams per kilogram of animal body weight preferably given in divided doses 2 to 4 times a day, or in sustained release form. For most mammals the daily dosage is generally from about 60 milligrams to about 1400 milligrams, and the preferred dosage forms comprise from about 15 milligrams to about 700 milligrams of the compound admixed with a solid or liquid pharmaceutical carrier or diluent. A representa-

3 tive formulation is a tablet prepared by standard tabletting techniques and containing the following ingredients:

Ingredients: Parts by wt.
3-pyridyl-2-thienyl ketone _____ 50
Tragacanth _____ 2
Lactose _____ 39.5
Corn starch _____ 5
Talcum _____ 3
Magnesium stearate _____ 0.5

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

2-Pyridyl-3-thienyl ketone

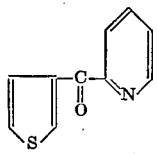

Procedure I

A solution of 2 g. of 3-bromothiophene in 25 ml. of absolute diethyl ether is added, dropwise, to 10 ml. of 15.8% butyllithium in hexane, at −70° C. and under a nitrogen atmosphere. The resulting mixture is stirred for 15 minutes and then 1.3 g. of 2-cyanopyridine in 20 ml. of absolute diethyl ether is added while maintaining the reaction temperature at −70° C. The resulting mixture is stirred for 1 hour at −70° C., then poured on ice and diluted with 125 ml. 2 N hydrochloric acid. The mixture thus obtained is neutralized with 50 ml. of 6 N sodium hydroxide and extracted 2 times with 100 ml. (each) of chloroform. The combined chloroform layers are washed with 75 ml. of water, dried over anhydrous sodium sulfate and evaporated in vacuo to yield 2-pyridyl-3-thienyl ketone as an oil, B.P. 170–180° C./0.6 mm.

Procedure II

Step A.—Preparation of 2-pyridyl-3-thienyl methanol— To 68 ml. of 1.6 M butyllithium solution in hexane is added with stirring, at −70° C. over a period of ½ to 2 hours, a solution of 16.3 g. of 3-bromothiophene in 50 ml. of absolute diethyl ether. The resulting mixture is stirred for an additional hour at −70° C. and then a solution of 8.5 g. of 2-pyridine carboxaldehyde in 50 ml. of diethyl ether is added. The resulting mixture is stirred for one hour and then poured over ice. The layers are separated and the aqueous phase extracted two times with 50 ml. (each) of diethyl ether. The combined organic layers are then washed with 75 ml. of water, dried over anhydrous sodium sulfate and evaporated in vacuo to obtain 2-pyridyl-3-thienyl methanol as an oil, B.P. 150–210° C./0.6 mm.

Step B.—Preparation of 2-pyridyl-3-thienyl ketone— To a mixture of 15.2 g. of 2-pyridyl-3-thienyl methanol, 90 ml. of acetic acid and 18 ml. of water is added, in small portions with ice cooling, 6 g. of chromium trioxide. The mixture is stirred overnight at room temperature and then poured over ice. Sodium hydroxide (50%) is then added until the mixture is alkaline (pH 8) and then extracted three times with 50 ml. (each) of chloroform. The combined chloroform layers are then washed with 50 ml. of water, dried over anhydrous sodium sulfate and evaporated in vacuo to yield 2-pyridyl-3-thienyl ketone as an oil, B.P. 170–180° C./0.6 mm. This compound also possesses significant anorectic activity at the dosage levels exemplified hereinabove.

4

EXAMPLE 2

2-pyridyl-2-thienyl ketone

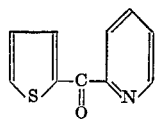

Procedure I

To a solution of 1.5 g. of picolinoyl chloride and 2.5 g. of thiophene in 50 ml. of carbon disulfide is added, at 10° C., 2 g. of aluminum chloride. The mixture is allowed to stand at room temperature for 16 hours, then the solvent decanted off and 20 ml. of ice cold 20% hydrochloric acid is added to the remaining precipitate. The resulting suspension is made alkaline to pH 8 with 2 N sodium hydroxide and extracted three times with 150 ml. (each) of chloroform. The combined chloroform layers are extracted twice with 300 ml. (each) of 20% hydrochloric acid, the aqueous phase neutralized with 50% sodium hydroxide and extracted twice with 200 ml. (each) of chloroform. The combined chloroform layers are then dried over anhydrous sodium sulfate and evaporated in vacuo to obtain 2-pyridyl-2-thienyl ketone as an oil, B.P. 138–140° C./0.6 mm.

Procedure II

Step A.—Preparation of 2-pyridyl-2-thienyl methanol— To a mixture of 12 ml. of 1.6 M butyllithium in hexane and 50 ml. of diethyl ether is added, dropwise, 3 g. of 2-bromopyridine in 20 ml. of diethyl ether, at −30 to −40° C. and under a nitrogen atmosphere. After 15 minutes, a solution of 1.8 g. of thiophene-2-carboxaldehyde in 20 ml. of diethyl ether is added and the reaction temperature permitted to rise slowly to about −5° C. The reaction temperature is maintained at about −5° C. for one hour and then 25 ml. of water is added with stirring. The ether layer is separated and the aqueous phase extracted twice with 25 ml. (each) of diethyl ether. The combined ether layers are washed with 50 ml. of water, dried over anhydrous sodium sulfate and evaporated in vacuo. The residue is crystallized from diethyl ether to obtain 2-pyridyl-2-thienyl methanol, M.P. 77–81° C.

Step B.—Preparation of 2-pyridyl-2-thienyl ketone— To a mixture of 6 g. of 2-pyridyl-2-thienyl methanol, 40 ml. of acetic acid and 8 ml. of water is added, in small portions with ice cooling, 2.6 g. of chromium trioxide. The mixture is stirred overnight at room temperature and then poured over ice. Sodium hydroxide (50%) is then added until the mixture is alkaline (pH 8) and then extracted three times with 50 ml. (each) of chloroform. The combined chloroform layers are washed with 50 ml. of water, dried over anhydrous sodium sulfate and evaporated in vacuo. The residue is distilled under high vacuum to obtain 2-pyridyl-2-thienyl ketone, B.P. 138–140° C./0.6 mm.

EXAMPLE 3

3-Pyridyl-2-thienyl ketone

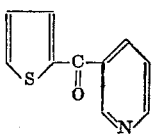

Step A.—Preparation of 3-pyridyl-2-thienyl methanol— To 34 ml. of 1.6 M butyllithium solution in hexane is added a solution of 5 g. of thiophene in 100 ml. of diethyl ether and the resulting mixture refluxed for 5 hours and then cooled to −30° C. To the cooled mixture is then added, with stirring, 6.6 g. of pyridine-3-carboxaldehyde in 50 ml. of diethyl ether. After the addition is completed, the reaction temperature is maintained at −30° C. for an additional hour and then allowed to warm to 0° C. To the resulting mixture is added 50 ml. of water, the aqueous layer separated and extracted three times with 100 ml. (each) of diethyl ether. The organic phases are combined, washed with 100 ml. of water, dried over anhydrous sodium sulfate and evaporated in vacuo to obtain 3-pyridyl-2-thienyl methanol as an oil.

Step B. Preparation of 3-pyridyl-2-thienyl ketone.—To a mixture of 10.7 g. of 3-pyridyl-2-thienyl methanol, 60 ml. of acetic acid and 12 ml. of water is added, in small portions with ice cooling, 4 g. of chromium trioxide. The mixture is stirred overnight at room temperature and then poured over ice. Sodium hydroxide (50%) is then added until the mixture is alkaline (pH 8) and then extracted three times with 50 ml. (each) of chloroform. The combined chloroform layers are then washed with 50 ml. of water, dried over anhydrous sodium sulfate and evaporated in vacuo. The residue is crystallized from methylene chloride-diethyl ether (1:2) to obtain 3-pyridyl-2-thienyl ketone, M.P. 92–95° C.

EXAMPLE 4

3-pyridyl-3-thienyl ketone

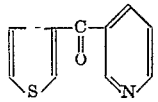

Step A. Preparation of 3-pyridyl-3-thienyl methanol.—To 102 ml. of 1.6 M butyllithium solution in hexane is added, with stirring at −70° C. over a period of ½ to 2 hours, a solution of 24.45 g. of 3-bromothiophene in 100 ml. of absolute diethyl ether. The resulting mixture is stirred for an additional hour at −70° C. and then a solution of 12 g. of 3-pyridine carboxaldehyde in 100 ml. of diethyl ether is added. The resulting mixture is stirred for 1 hour and then poured over ice. The layers are separated and the aqueous phase extracted 2 times with 50 ml. (each) of diethyl ether. The combined organic layers are then washed with 75 ml. of water, dried over anhydrous sodium sulfate and evaporated in vacuo to obtain 3-pyridyl-3-thienyl methanol as an oil.

Step B. Preparation of 3-pyridyl-3-thienyl ketone.—To a mixture of 25.5 g. of 3-pyridyl-3-thienyl methanol, 160 ml. of acetic acid and 24 ml. of water is added, in small portions with ice cooling, 9 g. of chromium trioxide. The mixture is stirred overnight at room temperature and then an additional 1 g. of chromium trioxide is added. The resulting mixture is stirred for an additional 4 hours at room temperature and then poured over ice. Sodium hydroxide (50%) is then added until the mixture is alkaline (pH 8) and then extracted three times with 50 ml. (each) of chloroform. The combined chloroform layers are then washed with 50 ml. of water, dried over anhydrous sodium sulfate and evaporated in vacuo. The residue is crystallized from diethyl ether to obtain 3-pyridyl-3-thienyl ketone, M.P. 72–74° C.

EXAMPLE 5

4-pyridyl-2-thienyl ketone

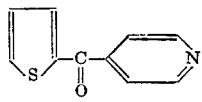

Step A. Preparation of 4-pyridyl-2-thienyl methanol.—To 132 ml. of 1.6 M butyllithium solution in hexane is added a solution of 15 g. of thiophene in 300 ml. of diethyl ether and the resulting mixture refluxed for 5 hours and then cooled to −30° C. To the cooled mixture is then added, with stirring, 19.8 g. of pyridine-4-carboxaldehyde in 100 ml. of diethyl ether. After the addition is completed, the reaction temperature is maintained at −30° C. for an additional hour and then allowed to warm to 0° C. To the resulting mixture is added 50 ml. of water, the aqueous layer separated and extracted three times with 100 ml. (each) of diethyl ether. The organic phases are combined, washed with 100 ml. of water, dried over anhydrous sodium sulfate and evaporated in vacuo to obtain 4-pyridyl-2-thienyl methanol, M.P. 120–130° C.

Step B. Preparation of 4-pyridyl-2-thienyl ketone.—To a mixture of 15 g. of 4-pyridyl-2-thienyl methanol, 90 ml. of acetic acid and 18 ml. of water is added, in small portions with ice cooling, 6 g. of chromium trioxide. The mixture is stirred overnight at room temperature and then poured over ice. Sodium hydroxide (50%) is then added until the mixture is alkaline (pH 8) and then extracted three times with 50 ml. (each) of chloroform. The combined chloroform layers are then washed with 50 ml. of water, dried over anhydrous sodium sulfate and evaporated in vacuo. The residue is crystallized from acetone-diethyl ether (1:2) to obtain 4-pyridyl-2-thienyl ketone, M.P. 94–97° C.

EXAMPLE 6

4-pyridyl-3-thienyl ketone

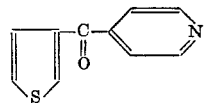

Step A. Preparation of 4-pyridyl-3-thienyl methanol.—To 102 ml. of 1.6 M butyllithium solution in hexane is added, with stirring at −70° C. over a period of ½ to 2 hours, a solution of 24.45 g. of 3-bromothiophene in 100 ml. of absolute diethyl ether. The resulting mixture is stirred for an additional hour at −70° C. and then a solution of 12 g. of 4-pyridine carboxaldehyde in 100 ml. of diethyl ether is added. The resulting mixture is stirred for 1 hour and then poured over ice. The layers are separated and the aqueous phase extracted two times with 50 ml. (each) of diethyl ether. The combined organic layers are then washed with 75 ml. of water, dried over anhydrous sodium sulfate and evaporated in vacuo to obtain 4-pyridyl-3-thienyl methanol.

Step B. Preparation of 4-pyridyl-3-thienyl ketone.—To a mixture of 20 g. of 4-pyridyl-3-thienyl methanol, 125 ml. of acetic acid and 19 ml. of water is added, in small portions with ice cooling, 7 g. of chromium trioxide. The mixture is stirred overnight at room temperature and then an additional 2 g. of chromium trioxide is added. The resulting mixture is stirred for an additional 4 hours at room temperature and then poured over ice. Sodium hydroxide (50%) is then added until the mixture is alkaline (pH 8) and then extracted three times with 50 ml. (each) of chloroform. The combined chloroform layers are then washed with 50 ml. of water, dried over anhydrous sodium sulfate and evaporated in vacuo. The residue is crystallized from methylene chloride-pentane (1:1) and then recrystallized from methylene chloride-pentane (1:1) to obtain 4-pyridyl-3-thienyl ketone, M.P. 98–100° C.

What is claimed is:
1. A compound selected from the group consisting of ketones of the formulae

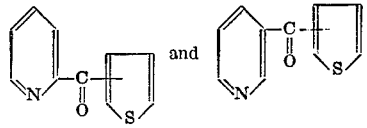

2. The compound of claim 1 which is 2-pyridyl-2-thienyl ketone.
3. The compound of claim 1 which is 2-pyridyl-3-thienyl ketone.
4. The compound of claim 1 which is 3-pyridyl-2-thienyl ketone.
5. The compound of claim 1 which is 3-pyridyl-3-thienyl ketone.
6. The compound 4-pyridyl-2-thienyl ketone.
7. The compound 4-pyridyl-3-thienyl ketone.

8. A process for preparing an unsubstituted pyridylthienyl carbinol which comprises contacting a pyridine carboxaldehyde with 2-lithium thiophene or 3-lithium thiophene in an inert organic solvent.

9. A process for preparing an unsubstituted pyridylthienyl ketone which comprises contacting a pyridine carboxaldehyde with 2-lithium thiophene or 3-lithium thiophene in an inert organic solvent to form the corresponding carbinol and oxidizing the carbinol by contacting the same in an inert organic solvent with chromium trioxide.

References Cited

Zelinsky et al., J. Am. Chem. Soc., vol. 73, pp. 696–7 (1951).

Miller et al., J. Am. Chem. Soc., vol. 78, pp. 674–6 (1956).

HENRY R. JILES, *Primary Examiner.*

NORMA S. MILESTONE, A. L. ROTMAN,
*Assistant Examiners.*